Jan. 13, 1942.  J. A. ST. CLAIR  2,269,556
METHOD FOR GRINDING SAWS
Filed May 19, 1938
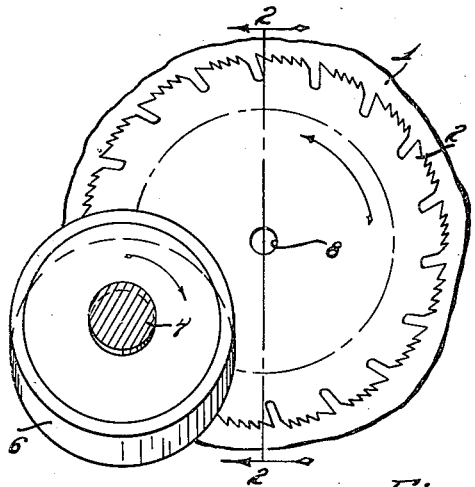
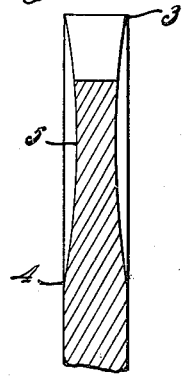
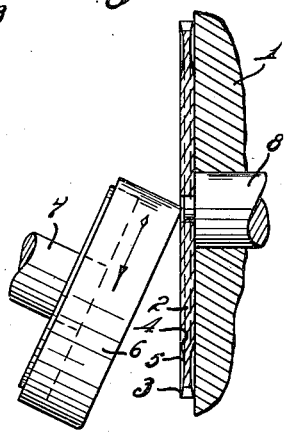
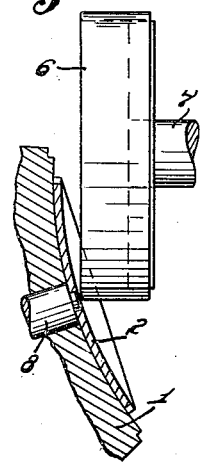
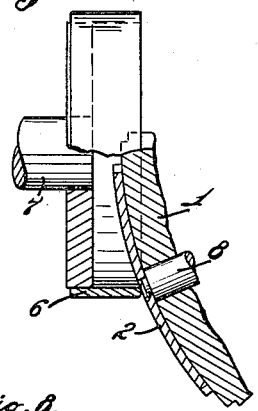
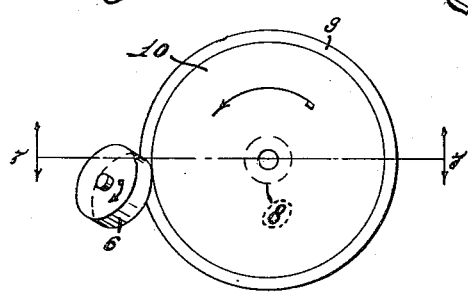
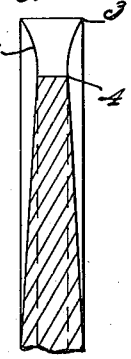
INVENTOR.
John A. St. Clair,
BY
Hood & Hahn.
ATTORNEYS.

Patented Jan. 13, 1942

2,269,556

UNITED STATES PATENT OFFICE 2,269,556

METHOD FOR GRINDING SAWS

John A. St. Clair, Indianapolis, Ind., assignor to E. C. Atkins and Company, Indianapolis, Ind., a corporation of Indiana Application May 19, 1938, Serial No. 208,833

3 Claims. (Cl. 51—281)

My invention relates to method and means for grinding saws and like articles and particularly disc saws.

Heretofore, in disc and similar saws, in order to provide suitable tooth clearance, it has been necessary to swage or set the teeth of the saw. While this has proved decidedly advantageous and is still decidedly advantageous, there are certain objections to providing clearance in saws of this character, due to the fact that in the swaging operation, it is almost impossible to obtain perfect uniformity in the teeth and as a result, there will be on the sides of the teeth, at their cutting edges, high and low points.

Another way of obtaining a clearance for saws of this character is to taper the saw from the tooth point down to the, in the case of a disc saw, center of the saw and, in the case of hand or other saws, back of the saw. Such tapering is expensive and hard to produce, and, furthermore, in the grinding of such tapering, frequently, the point of the tooth of the saw is destroyed, due to the character of the grinding wheel that must necessarily be employed.

It is one of the objects of my invention to provide a means whereby a suitable clearance may be provided in the saw from the point of the tooth downwardly in an economical manner and in such a manner as to give the most satisfactory type of clearance.

It is a further object of my invention to provide means whereby concave saws and the like may be ground on both faces in a most satisfactory manner.

For the purpose of disclosing my invention, I have illustrated an embodiment thereof in the accompanying drawing, in which:

Fig. 1 is a front elevation, more or less diagrammatic, of a saw and its associated grinding wheel;

Fig. 2 is a sectional view on the line 2—2 of Fig. 1;

Fig. 3 is an enlarged detail section of a saw after it has been ground in accordance with my method;

Fig. 4 is a detail sectional view showing the method of grinding the outside of a concave saw;

Fig. 5 is a detail sectional showing the method of grinding the inside or concave face of a concave saw;

Fig. 6 is a view similar to Fig. 1 showing the method of grinding the bevel of a knife;

Fig. 7 is a sectional view on the line 7—7 of Fig. 6; and

Fig. 8 is a sectional view of another form of saw in which I have hollow ground a portion of the face of the saw by the method hereinafter described.

In the embodiment illustrated, I provide a suitable holding means 1 for the saw, which may be in the form of an electromagnetic chuck which is now commercially used in the holding of saws to be ground. The particular disc saw 2 is shown attached to the face of this chuck, and for concave grinding the face of the saw from the point 3 of the tooth downwardly to the point 4 which is well below the point 3 of the tooth, to provide a concave clearance 5, I provide a cup-shaped grinding wheel 6 mounted to rotate on an axis 7, which axis extends at an angle to an axis parallel with the axis 8 of the saw. This wheel is rotated in the direction of the arrows, as illustrated and, at the same time, the disc saw is rotated in the direction of the arrows, as illustrated. As the result of the presentation of the cup grinding wheel to the face of the saw at an angle, as illustrated, I am enabled to concavely grind the face of the saw at its outer periphery in such a manner that the concavity begins at the point of the tooth, thereby, in effect, taper grinding the tooth in such a manner as to insure a sharp cutting point at the extreme edge of the tooth and without any danger of destroying this edge.

It will be seen that the grinding wheel may be presented at different angles to the face of the saw to increase or decrease the concavity or hollow grinding of the saw, and it will also be observed that, due to the tilting or angular displacement of the hollow grinding or cup-shaped grinding wheel, a relatively small grinding wheel may be used to obtain the desired concavity on the face of the saw.

In Figs. 4 and 5, I have illustrated the method of grinding both the concave and convex sides of a concave saw. In Fig. 4, it will be seen that the inner edge of the cup grinding wheel is presented to the saw during its rotation; and in Fig. 5 the outer edge of the cup grinding wheel is presented to the saw beginning at the center thereof and moving outwardly as the grinding operation progresses. In this instance, as in the instances illustrated in Figs. 1 to 3, the axis of the cup grinding wheel is presented angularly with respect to the axis of the saw.

In Figs. 6 and 7 I have shown the application of my method to hollow grinding the cutting edge of a circular knife. As illustrated in these figures, the cup grinding wheel 6 is presented to the beveled face 9 of a circular knife 10 in the same manner as it is presented to the saw as illustrated in Fig. 1. The cup grinding wheel and the knife are rotated in the direction as indicated by the arrows, resulting in a hollow grinding of the beveled edge of the knife. In order to hollow grind the back face of the knife, the wheel is presented to the back face in the same manner as it is presented to the face of the saw shown in Fig. 1.

By bevel grinding the saw as heretofore described, I am enabled to obtain perfect uniformity in the teeth and at the same time provide the proper clearance for the teeth without destroying the point of the tooth in any way. Furthermore, by the grinding of the saw in the manner heretofore described, the saw is prevented from freezing during the cutting operation and furthermore, the chips produced by the sawing operation are more quickly cleared and the unnecessary heating of the face or sides of the teeth is prevented.

I claim as my invention:

1. The method of grinding a saw which consists in presenting a cup grinding wheel against the face of the saw with the axis of the wheel in a plane offset from and parallel with the axis of the saw and inclined to the axis of the saw and with the grinding wheel engaging the surface of the saw tangentially to the radius of the saw, simultaneously rotating the saw and grinding wheel and maintaining said relationship constant during grinding operation.

2. The method of grinding a circular saw which consists in rigidly backing the saw throughout its circumference, presenting a cup grinding wheel against the surface of the saw at a point extending from the tip of the teeth inwardly with the axis of the wheel in a plane offset from and parallel with the axis of the saw and with the axis of the wheel inclined to the axis of the saw and with the grinding wheel engaging the surface of the saw tangentially to the radius of the saw, simultaneously rotating the saw and grinding wheel and maintaining said relationship constant during the grinding operation.

3. The method of grinding a circular saw which consists in presenting a cup grinding wheel against the surface of the saw at a point adjacent the toothed edge thereof with the axis of the wheel in a plane offset from a plane passing through the axis of the saw and parallel therewith and lying at an angle to a plane extending at right angles to said plane of the axis of the saw, simultaneously rotating the saw and grinding wheel and maintaining said relationship constant during grinding operation.

JOHN A. ST. CLAIR.